United States Patent
Blankenship et al.

(10) Patent No.: US 9,884,533 B2
(45) Date of Patent: *Feb. 6, 2018

(54) AUTONOMOUS CONTROL DAMPER

(71) Applicant: Tenneco Automotive Operating Company Inc., Lake Forest, IL (US)

(72) Inventors: David R. Blankenship, Canton, MI (US); Scott S. Dunaway, Carleton, MI (US); Karl C. Kazmirski, Temperance, MI (US); Mayur Rathan, Troy, MI (US)

(73) Assignee: Tenneco Automotive Operating Company Inc., Lake Forest, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/192,173

(22) Filed: Feb. 27, 2014

(65) Prior Publication Data

US 2014/0239602 A1 Aug. 28, 2014

Related U.S. Application Data

(60) Provisional application No. 61/770,426, filed on Feb. 28, 2013.

(51) Int. Cl.
*B60G 17/08* (2006.01)
*B60G 17/015* (2006.01)
(Continued)

(52) U.S. Cl.
CPC ............ *B60G 17/08* (2013.01); *B60G 13/00* (2013.01); *B60G 13/08* (2013.01); *B60G 17/015* (2013.01);
(Continued)

(58) Field of Classification Search
CPC .. B60G 17/00; B60G 17/015; B60G 17/0152; B60G 17/019; B60G 17/01908; B60G 17/08; B60G 2202/24; F16F 9/325
See application file for complete search history.

(56) References Cited

U.S. PATENT DOCUMENTS 2,409,349 A 10/1946 Focht
2,473,043 A 6/1949 Whisler
(Continued)

FOREIGN PATENT DOCUMENTS

CN 1094855 C 11/2002
CN 1267611 C 8/2006
(Continued)

OTHER PUBLICATIONS

Search Report and Written Opinion dated Jun. 19, 2014 in corresponding PCT Application No. PCT/US2014/019400 (12 pages).

(Continued)

*Primary Examiner* — Barry Gooden, Jr.
(74) *Attorney, Agent, or Firm* — Harness, Dickey & Pierce, P.L.C.

(57) ABSTRACT

A damper system for a vehicle comprises an electrically adjustable hydraulic shock absorber and a damper control module. The damper control module is disposed with and coupled to with the shock absorber. The damper control module determines a target damping state of the shock absorber based on data received from a plurality of sensors. Furthermore, the damper control module controls the shock absorber, such that the shock absorber operates at the target damping state.

20 Claims, 7 Drawing Sheets

(51) Int. Cl.
*B60G 17/019* (2006.01)
*F16F 9/46* (2006.01)
*B60G 13/00* (2006.01)
*F16F 9/32* (2006.01)
*B60G 21/05* (2006.01)
*B60G 13/08* (2006.01)

(52) U.S. Cl.
CPC ....... *B60G 17/019* (2013.01); *B60G 17/0152* (2013.01); *B60G 17/01908* (2013.01); *B60G 21/051* (2013.01); *F16F 9/3207* (2013.01); *F16F 9/3292* (2013.01); *F16F 9/463* (2013.01); *F16F 9/464* (2013.01); *B60G 2202/24* (2013.01); *B60G 2204/112* (2013.01); *B60G 2401/17* (2013.01); *B60G 2500/114* (2013.01); *B60G 2600/182* (2013.01); *B60G 2600/71* (2013.01); *B60G 2600/73* (2013.01); *B60G 2800/162* (2013.01)

(56) References Cited

U.S. PATENT DOCUMENTS

| | | | |
|---|---|---|---|
| 3,896,908 A | | 7/1975 | Petrak |
| 3,945,474 A | | 3/1976 | Palmer |
| 4,317,105 A | | 2/1982 | Sinha et al. |
| 4,468,050 A | * | 8/1984 | Woods et al. ............... 280/5.514 |
| 4,552,324 A | | 11/1985 | Hrusch |
| 4,564,214 A | * | 1/1986 | Tokunaga et al. .......... 280/5.512 |
| 4,589,528 A | | 5/1986 | Axthammer et al. |
| 4,591,186 A | * | 5/1986 | Ashiba ....................... 188/266.4 |
| 4,696,489 A | | 9/1987 | Fujishiro et al. |
| 4,723,640 A | | 2/1988 | Beck |
| 4,726,453 A | | 2/1988 | Obstfelder et al. |
| 4,749,070 A | | 6/1988 | Moser et al. |
| 4,776,437 A | | 10/1988 | Ishibashi et al. |
| 4,788,489 A | | 11/1988 | Kobayashi et al. |
| 4,846,317 A | | 7/1989 | Hudgens |
| 4,850,460 A | | 7/1989 | Knecht et al. |
| 4,867,476 A | | 9/1989 | Yamanaka et al. |
| 4,872,537 A | | 10/1989 | Warner |
| 4,892,328 A | | 1/1990 | Kurtzman et al. |
| 4,909,536 A | | 3/1990 | Hale |
| 4,913,457 A | | 4/1990 | Hafner et al. |
| 4,958,706 A | | 9/1990 | Richardson et al. |
| 4,969,662 A | | 11/1990 | Stuart |
| 4,973,854 A | | 11/1990 | Hummel |
| 4,984,819 A | | 1/1991 | Kakizaki et al. |
| 4,986,393 A | | 1/1991 | Preukschat et al. |
| 4,988,967 A | * | 1/1991 | Miller et al. .................. 335/279 |
| 5,038,613 A | | 8/1991 | Takenaka et al. |
| 5,058,715 A | | 10/1991 | Silberstein |
| 5,067,743 A | | 11/1991 | Kokubo et al. |
| 5,092,626 A | * | 3/1992 | Athanas ............... B60G 17/015 188/282.4 |
| 5,106,053 A | * | 4/1992 | Miller et al. ............... 251/129.05 |
| 5,123,671 A | * | 6/1992 | Driessen ............... B60G 17/018 188/266.5 |
| 5,133,434 A | | 7/1992 | Kikushima et al. |
| 5,133,574 A | * | 7/1992 | Yamaoka ......... B60G 17/01941 280/5.519 |
| 5,143,185 A | | 9/1992 | Klein et al. |
| 5,154,442 A | | 10/1992 | Milliken |
| 5,160,162 A | | 11/1992 | Mouri et al. |
| 5,189,614 A | | 2/1993 | Mitsuoka et al. |
| 5,200,895 A | | 4/1993 | Emura et al. |
| 5,242,190 A | | 9/1993 | Morris |
| 5,285,878 A | | 2/1994 | Scheffel et al. |
| 5,293,968 A | | 3/1994 | Schuelke et al. |
| 5,299,488 A | | 4/1994 | Kadlicko et al. |
| 5,337,863 A | | 8/1994 | Lizell |
| 5,350,187 A | | 9/1994 | Shinozaki |
| 5,350,983 A | | 9/1994 | Miller et al. |
| 5,360,089 A | | 11/1994 | Nakamura et al. |
| 5,360,230 A | | 11/1994 | Yamada et al. |
| 5,363,945 A | | 11/1994 | Lizell et al. |
| 5,383,679 A | | 1/1995 | Nakamura et al. |
| 5,390,121 A | | 2/1995 | Wolfe |
| 5,396,973 A | | 3/1995 | Schwemmer et al. |
| 5,404,973 A | | 4/1995 | Katoh et al. |
| 5,430,648 A | | 7/1995 | Sasaki |
| 5,435,421 A | * | 7/1995 | Beck ....................... F16F 9/369 188/266.6 |
| 5,439,085 A | | 8/1995 | Woessner |
| 5,485,417 A | | 1/1996 | Wolf et al. |
| 5,487,455 A | | 1/1996 | Feigel |
| 5,488,556 A | | 1/1996 | Sasaki |
| 5,497,325 A | | 3/1996 | Mine |
| 5,497,862 A | | 3/1996 | Hoya |
| 5,532,921 A | | 7/1996 | Katsuda |
| 5,570,762 A | | 11/1996 | Jentsch et al. |
| 5,577,579 A | * | 11/1996 | Derr ....................... F16F 9/3207 188/288 |
| 5,590,898 A | | 1/1997 | Williams et al. |
| 5,597,054 A | | 1/1997 | Nagai et al. |
| 5,632,503 A | | 5/1997 | Raad et al. |
| 5,638,275 A | * | 6/1997 | Sasaki ................ B60G 17/0152 280/5.505 |
| 5,653,315 A | | 8/1997 | Ekquist et al. |
| 5,655,633 A | | 8/1997 | Nakadate et al. |
| 5,656,315 A | | 8/1997 | Tucker et al. |
| 5,657,840 A | | 8/1997 | Lizell |
| 5,690,195 A | | 11/1997 | Kruckemeyer et al. |
| 5,725,239 A | | 3/1998 | de Molina |
| 5,775,470 A | | 7/1998 | Feigel |
| 5,803,482 A | | 9/1998 | Kim |
| 5,833,036 A | | 11/1998 | Gillespie |
| 5,845,672 A | | 12/1998 | Reuter et al. |
| 5,860,497 A | | 1/1999 | Takahashi |
| 5,878,851 A | | 3/1999 | Carlson et al. |
| 5,890,081 A | * | 3/1999 | Sasaki ................... B60G 17/018 280/5.515 |
| 5,913,391 A | | 6/1999 | Jeffries et al. |
| 5,934,421 A | * | 8/1999 | Nakadate ................ F16F 9/325 188/299.1 |
| 5,937,976 A | | 8/1999 | Grundei |
| 5,950,775 A | | 9/1999 | Achmad |
| 5,967,268 A | | 10/1999 | de Molina et al. |
| 5,987,369 A | | 11/1999 | Kwak et al. |
| 5,996,745 A | | 12/1999 | Jones, Jr. et al. |
| 6,003,644 A | | 12/1999 | Tanaka |
| 6,036,500 A | | 3/2000 | Francis et al. |
| 6,092,011 A | | 7/2000 | Hiramoto |
| 6,095,489 A | | 8/2000 | Kaneko et al. |
| 6,105,740 A | * | 8/2000 | Marzocchi ............ B60G 17/021 188/298 |
| 6,109,400 A | | 8/2000 | Ayyildiz et al. |
| 6,135,250 A | * | 10/2000 | Forster ....................... F16F 9/46 188/266.5 |
| 6,155,391 A | | 12/2000 | Kashiwagi et al. |
| 6,213,262 B1 | | 4/2001 | Bell |
| 6,273,224 B1 | | 8/2001 | Achmad |
| 6,296,091 B1 | | 10/2001 | Hamilton |
| 6,298,958 B1 | | 10/2001 | Hwang |
| 6,302,248 B1 | | 10/2001 | Nakadate |
| 6,321,888 B1 | | 11/2001 | Reybrouck et al. |
| 6,343,677 B2 | | 2/2002 | Bell |
| 6,427,986 B1 | | 8/2002 | Sakai et al. |
| 6,460,664 B1 | | 10/2002 | Steed et al. |
| 6,496,761 B1 | | 12/2002 | Ulyanov et al. |
| 6,533,294 B1 | | 3/2003 | Germain et al. |
| 6,588,726 B2 | | 7/2003 | Osterhart et al. |
| 6,616,124 B2 | | 9/2003 | Oliver et al. |
| 6,651,787 B2 | | 11/2003 | Grundei |
| 6,655,512 B2 | | 12/2003 | Moradmand et al. |
| 6,672,436 B1 | | 1/2004 | Keil et al. |
| 6,707,290 B2 | | 3/2004 | Nyce et al. |
| 6,708,803 B2 | | 3/2004 | Jensen |
| 6,782,980 B2 | | 8/2004 | Nakadate |
| 6,814,193 B2 | | 11/2004 | Grundei |
| 6,851,528 B2 | | 2/2005 | Lemieux |
| 6,879,898 B2 | | 4/2005 | Ghoneim et al. |
| 6,904,344 B2 | | 6/2005 | LaPlante et al. |
| 6,959,797 B2 | | 11/2005 | Mintgen et al. |

(56) References Cited

U.S. PATENT DOCUMENTS

| | | | |
|---|---|---|---|
| 6,964,325 B2 | 11/2005 | Maes |
| 6,978,872 B2 | 12/2005 | Turner |
| 7,032,912 B2 | 4/2006 | Nicot et al. |
| 7,168,709 B2 | 1/2007 | Niwa et al. |
| 7,214,103 B2 | 5/2007 | Kim et al. |
| 7,234,574 B2 | 6/2007 | Matsunaga et al. |
| 7,234,707 B2 | 6/2007 | Green et al. |
| 7,273,138 B2 | 9/2007 | Park |
| 7,286,919 B2 | 10/2007 | Nordgren et al. |
| 7,318,595 B2 | 1/2008 | Lamela et al. |
| 7,347,307 B2 | 3/2008 | Joly |
| 7,374,028 B2 | 5/2008 | Fox |
| 7,389,994 B2 | 6/2008 | Trudeau et al. |
| 7,413,062 B2 | 8/2008 | Vandewal |
| 7,416,189 B2 | 8/2008 | Wilde et al. |
| 7,475,538 B2 | 1/2009 | Bishop |
| 7,493,995 B2 | 2/2009 | Sas et al. |
| 7,604,101 B2 | 10/2009 | Park |
| 7,611,000 B2 | 11/2009 | Naito |
| 7,621,538 B2 | 11/2009 | Nordmeyer et al. |
| 7,628,253 B2 * | 12/2009 | Jin et al. ............... 188/266.1 |
| 7,644,933 B2 | 1/2010 | Brookes et al. |
| 7,654,369 B2 | 2/2010 | Murray et al. |
| 7,654,370 B2 | 2/2010 | Cubalchini, Jr. |
| 7,680,573 B2 | 3/2010 | Ogawa |
| 7,722,405 B2 | 5/2010 | Jaklin et al. |
| 7,743,896 B2 | 6/2010 | Vanhees et al. |
| 7,770,983 B2 | 8/2010 | Park |
| 7,775,333 B2 | 8/2010 | Or et al. |
| 7,849,983 B2 | 12/2010 | St. Clair et al. |
| 7,878,311 B2 | 2/2011 | Van Weelden et al. |
| 7,896,311 B2 | 3/2011 | Jee |
| 7,912,603 B2 | 3/2011 | Stiller et al. |
| 7,926,513 B2 | 4/2011 | Ishibashi et al. |
| 7,931,282 B2 | 4/2011 | Kolp et al. |
| 7,942,248 B2 | 5/2011 | St. Clair et al. |
| 7,946,163 B2 | 5/2011 | Gartner |
| 7,946,399 B2 | 5/2011 | Masamura |
| 7,967,116 B2 | 6/2011 | Boerschig |
| 7,967,117 B2 | 6/2011 | Abe |
| 7,992,692 B2 | 8/2011 | Lee et al. |
| 7,997,394 B2 | 8/2011 | Yamaguchi |
| 8,056,392 B2 | 11/2011 | Ryan et al. |
| 8,075,002 B1 | 12/2011 | Pionke et al. |
| 8,113,521 B2 | 2/2012 | Lin et al. |
| 8,116,939 B2 | 2/2012 | Kajino et al. |
| 8,132,654 B2 | 3/2012 | Widla et al. |
| 8,136,644 B2 | 3/2012 | Sonsterod |
| 8,160,774 B2 | 4/2012 | Li et al. |
| 8,214,106 B2 | 7/2012 | Ghoneim et al. |
| 8,267,382 B2 | 9/2012 | Yazaki et al. |
| 8,317,172 B2 | 11/2012 | Quinn et al. |
| 8,393,446 B2 | 3/2013 | Haugen |
| 8,430,217 B2 | 4/2013 | Hennecke et al. |
| 8,525,453 B2 | 9/2013 | Ogawa |
| 8,567,575 B2 | 10/2013 | Jung et al. |
| 8,616,351 B2 | 12/2013 | Roessle et al. |
| 8,666,596 B2 | 3/2014 | Arenz |
| 8,684,367 B2 | 4/2014 | Haugen |
| 8,695,766 B2 | 4/2014 | Yamashita et al. |
| 8,794,405 B2 | 8/2014 | Yamashita et al. |
| 8,844,687 B2 | 9/2014 | Yu et al. |
| 8,899,391 B2 * | 12/2014 | Yamasaki ............... B60G 17/08 188/315 |
| 8,948,941 B2 | 2/2015 | Ogawa |
| 9,027,937 B2 * | 5/2015 | Ryan ............... B60G 17/016 280/5.519 |
| 9,150,077 B2 | 10/2015 | Roessle et al. |
| 9,163,691 B2 | 10/2015 | Roessle et al. |
| 9,188,186 B2 | 11/2015 | Hoven et al. |
| 9,217,483 B2 * | 12/2015 | Dunaway ............... B60G 17/0152 |
| 9,399,383 B2 | 7/2016 | Blankenship et al. |
| 2002/0133277 A1 | 9/2002 | Koh |
| 2003/0164193 A1 | 9/2003 | Lou |
| 2003/0192755 A1 | 10/2003 | Barbison et al. |
| 2004/0090020 A1 | 5/2004 | Braswell |
| 2004/0154887 A1 | 8/2004 | Nehl et al. |
| 2004/0199313 A1 | 10/2004 | Dellinger |
| 2005/0001472 A1 | 1/2005 | Bale et al. |
| 2005/0029063 A1 | 2/2005 | Neumann |
| 2005/0056502 A1 | 3/2005 | Maes |
| 2005/0056504 A1 * | 3/2005 | Holiviers ............... F16F 9/325 188/322.2 |
| 2005/0061593 A1 * | 3/2005 | DeGronckel ........... F16F 9/325 188/313 |
| 2005/0085969 A1 | 4/2005 | Kim |
| 2005/0113997 A1 | 5/2005 | Kim |
| 2005/0173849 A1 | 8/2005 | Vandewal |
| 2006/0038149 A1 | 2/2006 | Albert et al. |
| 2006/0124415 A1 | 6/2006 | Joly |
| 2006/0219503 A1 | 10/2006 | Kim |
| 2007/0034466 A1 | 2/2007 | Paesmans et al. |
| 2007/0051574 A1 | 3/2007 | Keil et al. |
| 2007/0255466 A1 | 11/2007 | Chiao |
| 2008/0054537 A1 | 3/2008 | Harrison |
| 2008/0243336 A1 | 10/2008 | Fitzgibbons |
| 2008/0250844 A1 | 10/2008 | Gartner |
| 2008/0264743 A1 * | 10/2008 | Lee ............... F16F 9/3292 188/266 |
| 2008/0277218 A1 | 11/2008 | Fox |
| 2009/0071772 A1 * | 3/2009 | Cho et al. ............... 188/266.4 |
| 2009/0078517 A1 | 3/2009 | Maneyama et al. |
| 2009/0084647 A1 | 4/2009 | Maneyama et al. |
| 2009/0132122 A1 | 5/2009 | Kim et al. |
| 2009/0192673 A1 | 7/2009 | Song et al. |
| 2009/0200125 A1 * | 8/2009 | Sonsterod ............... 188/266.4 |
| 2009/0200503 A1 | 8/2009 | Park |
| 2010/0001217 A1 | 1/2010 | Jee et al. |
| 2010/0018818 A1 * | 1/2010 | Ishii ............... F16F 9/065 188/319.1 |
| 2010/0044172 A1 | 2/2010 | Jee et al. |
| 2010/0066051 A1 | 3/2010 | Haugen |
| 2010/0109276 A1 | 5/2010 | Marjoram et al. |
| 2010/0138116 A1 | 6/2010 | Coombs |
| 2010/0163354 A1 | 7/2010 | Braun |
| 2010/0181154 A1 | 7/2010 | Panichgasem |
| 2010/0191420 A1 | 7/2010 | Honma et al. |
| 2010/0211253 A1 | 8/2010 | Morais Dos Santos et al. |
| 2010/0276906 A1 | 11/2010 | Galasso et al. |
| 2010/0301578 A1 * | 12/2010 | Noda ............... B60G 21/0558 280/124.106 |
| 2010/0326267 A1 * | 12/2010 | Hata ............... F16F 9/325 91/468 |
| 2011/0017559 A1 * | 1/2011 | Sintorn ............... B60G 13/08 188/314 |
| 2011/0035091 A1 | 2/2011 | Yamamoto |
| 2011/0056780 A1 | 3/2011 | St.Clair et al. |
| 2011/0056783 A1 | 3/2011 | Teraoka et al. |
| 2011/0079475 A1 | 4/2011 | Roessle et al. |
| 2011/0101579 A1 | 5/2011 | Polakowski et al. |
| 2011/0153157 A1 | 6/2011 | Klank et al. |
| 2011/0198172 A1 | 8/2011 | Whan |
| 2011/0214956 A1 | 9/2011 | Marking |
| 2011/0240424 A1 | 10/2011 | Beck |
| 2011/0298399 A1 | 12/2011 | Ogawa et al. |
| 2012/0018263 A1 | 1/2012 | Marking |
| 2012/0048665 A1 | 3/2012 | Marking |
| 2012/0073918 A1 * | 3/2012 | Nishimura ............... B60G 13/06 188/266.2 |
| 2012/0073920 A1 * | 3/2012 | Yamasaki ............... B60G 17/08 188/315 |
| 2012/0181126 A1 | 7/2012 | de Kock |
| 2012/0186922 A1 | 7/2012 | Battlogg et al. |
| 2012/0228072 A1 | 9/2012 | Mangelschots et al. |
| 2012/0305349 A1 * | 12/2012 | Murakami ............... F16F 9/325 188/266.6 |
| 2013/0081913 A1 * | 4/2013 | Nowaczyk ............... F16F 9/325 188/315 |
| 2013/0090808 A1 | 4/2013 | Lemme et al. |
| 2013/0228401 A1 | 9/2013 | Bender et al. |
| 2013/0234379 A1 | 9/2013 | Panichgasem |
| 2013/0263943 A1 | 10/2013 | Forster |
| 2013/0275003 A1 | 10/2013 | Uchino et al. |

(56) References Cited

U.S. PATENT DOCUMENTS

| | | | |
|---|---|---|---|
| 2013/0299291 | A1 | 11/2013 | Ewers et al. |
| 2013/0313057 | A1 | 11/2013 | Tsukahara et al. |
| 2013/0328277 | A1 | 12/2013 | Ryan et al. |
| 2013/0340865 | A1 | 12/2013 | Manger et al. |
| 2013/0341140 | A1 | 12/2013 | Nakajima |
| 2013/0341842 | A1 | 12/2013 | Weber |
| 2013/0345933 | A1* | 12/2013 | Norton et al. ................ 701/37 |
| 2014/0102842 | A1 | 4/2014 | Roessle et al. |
| 2014/0125018 | A1 | 5/2014 | Brady et al. |
| 2014/0202808 | A1 | 7/2014 | Spyche, Jr. et al. |
| 2014/0216871 | A1 | 8/2014 | Shibahara |
| 2014/0231200 | A1 | 8/2014 | Katayama |
| 2014/0238797 | A1 | 8/2014 | Blankenship et al. |
| 2014/0239602 | A1 | 8/2014 | Blankenship et al. |
| 2014/0244112 | A1 | 8/2014 | Dunaway et al. |
| 2014/0260233 | A1 | 9/2014 | Giovanardi et al. |
| 2014/0262648 | A1 | 9/2014 | Roessle et al. |
| 2014/0262654 | A1 | 9/2014 | Roessle et al. |
| 2014/0265169 | A1 | 9/2014 | Giovanardi et al. |
| 2014/0265170 | A1 | 9/2014 | Giovanardi et al. |
| 2014/0284156 | A1 | 9/2014 | Kim |
| 2014/0291090 | A1 | 10/2014 | Shimasaki |
| 2014/0297116 | A1 | 10/2014 | Anderson et al. |
| 2014/0297117 | A1* | 10/2014 | Near et al. ................ 701/37 |
| 2014/0303844 | A1 | 10/2014 | Hoffmann et al. |
| 2015/0088379 | A1* | 3/2015 | Hirao ................ 701/37 |

FOREIGN PATENT DOCUMENTS

| | | |
|---|---|---|
| CN | 101025213 A | 8/2007 |
| CN | 100381728 C | 4/2008 |
| CN | 101229765 A | 7/2008 |
| CN | 101509535 A | 8/2009 |
| CN | 201575099 U | 9/2010 |
| CN | 201575100 U | 9/2010 |
| CN | 101857035 A | 10/2010 |
| CN | 201636258 U | 11/2010 |
| CN | 201705852 U | 1/2011 |
| CN | 102032306 A | 4/2011 |
| CN | 102076988 A | 5/2011 |
| CN | 102109024 A | 6/2011 |
| CN | 102345700 A | 2/2012 |
| CN | 103154562 A | 6/2013 |
| CN | 103168183 A | 6/2013 |
| CN | 103244495 A | 8/2013 |
| CN | 203186023 U | 9/2013 |
| CN | 103429929 A | 12/2013 |
| CN | 103702888 A | 4/2014 |
| CN | 203548687 U | 4/2014 |
| CN | 103946095 A | 7/2014 |
| CN | 104074909 A | 10/2014 |
| DE | 3406875 A1 | 9/1985 |
| DE | 3518858 A1 | 11/1985 |
| DE | 3432465 A1 | 3/1986 |
| DE | 3518327 A1 | 11/1986 |
| DE | 3928343 A1 | 2/1991 |
| DE | 4041619 A1 | 6/1992 |
| DE | 19853277 C1 | 5/2000 |
| DE | 10025399 A1 | 12/2000 |
| DE | 10238657 A1 | 3/2004 |
| DE | 112007002377 T5 | 8/2009 |
| EP | 1 588 072 | 10/2005 |
| EP | 1746302 A1 | 1/2007 |
| EP | 2105330 A1 | 9/2009 |
| GB | 2123922 A | 2/1984 |
| GB | 2154700 A | 9/1985 |
| JP | S60138044 U | 9/1985 |
| JP | 61125907 | 6/1986 |
| JP | S61266842 | 11/1986 |
| JP | 62-253506 | 11/1987 |
| JP | S6467408 A | 3/1989 |
| JP | H0550827 A | 3/1993 |
| JP | 06-026546 | 2/1994 |
| JP | 07-113434 | 5/1995 |
| JP | 7056311 | 6/1995 |
| JP | H0899514 A | 4/1996 |
| JP | 08-260747 | 10/1996 |
| JP | 09-217779 | 8/1997 |
| JP | 200267650 A | 3/2002 |
| JP | 2002-349630 A | 12/2002 |
| JP | 2008106783 A | 5/2008 |
| JP | 2009002360 A | 1/2009 |
| JP | 201198683 A | 5/2011 |
| JP | 2011236937 A | 11/2011 |
| WO | 9218788 A1 | 10/1992 |
| WO | WO-2010029133 A1 | 3/2010 |

OTHER PUBLICATIONS

Office Action from German Patent Office for corresponding German Application No. 11 2010 003 954.2 dated Dec. 9, 2015, 19 pages.

* cited by examiner

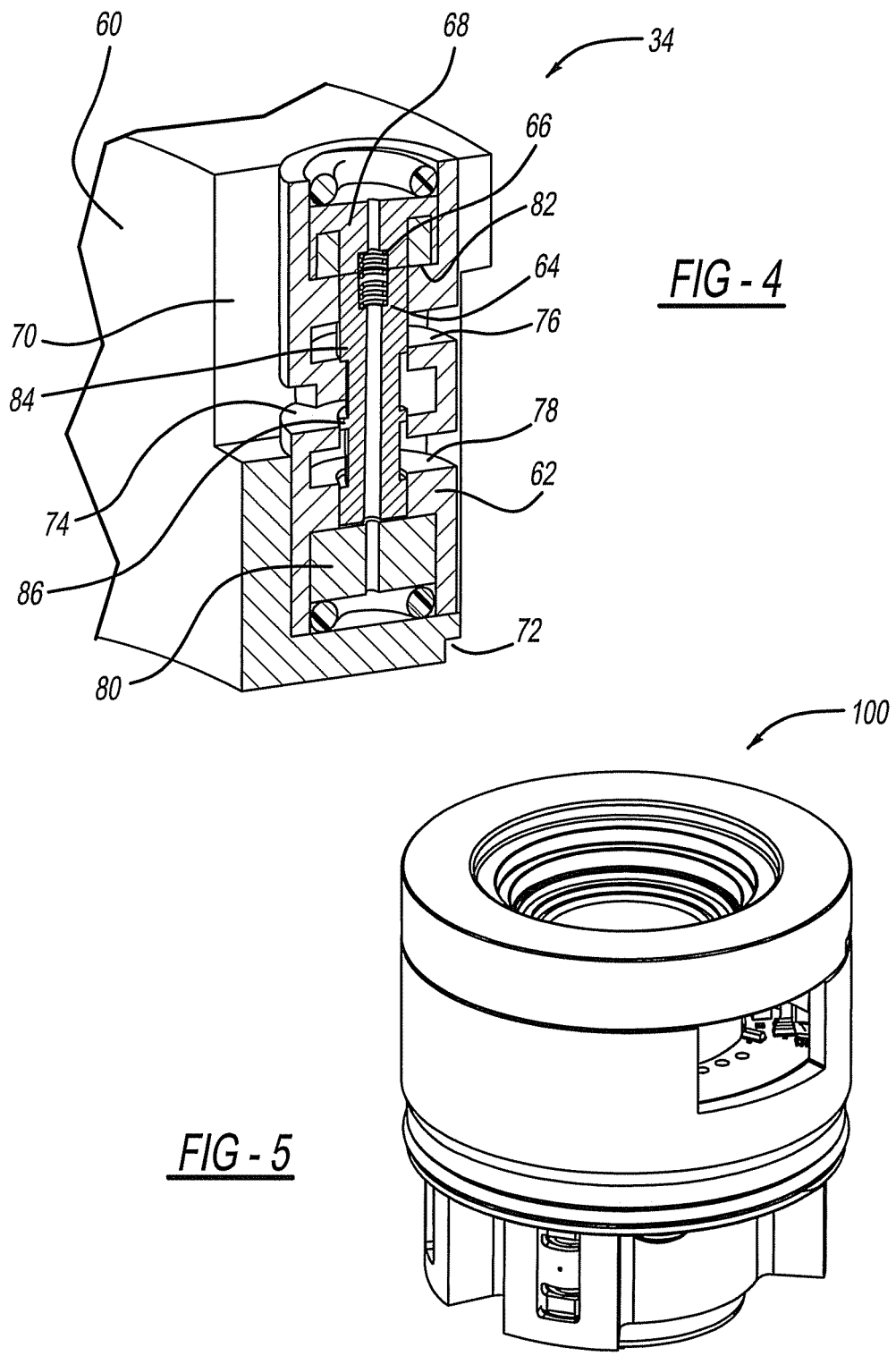

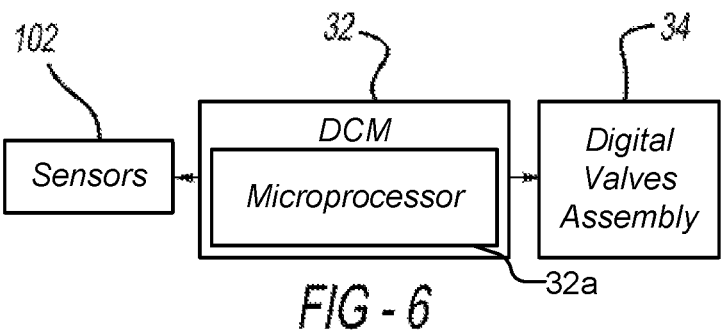
FIG - 6
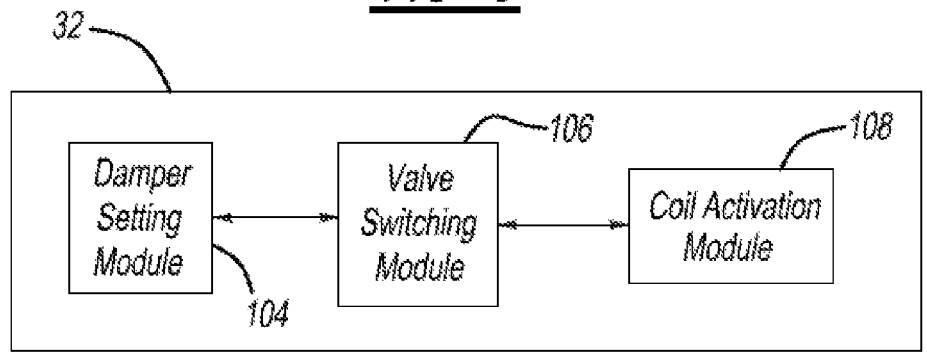
FIG - 7
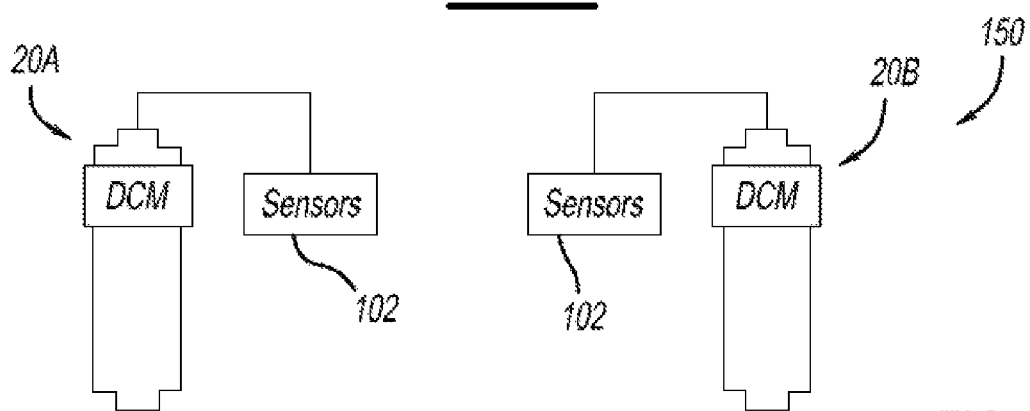
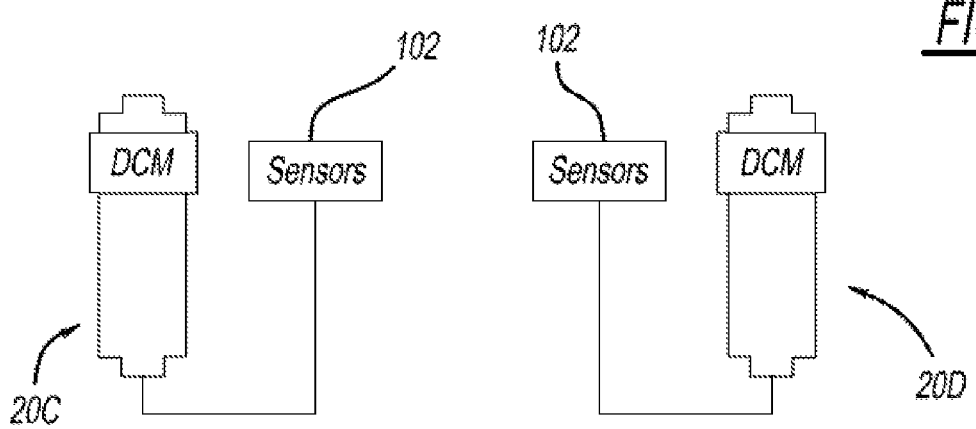
FIG - 8

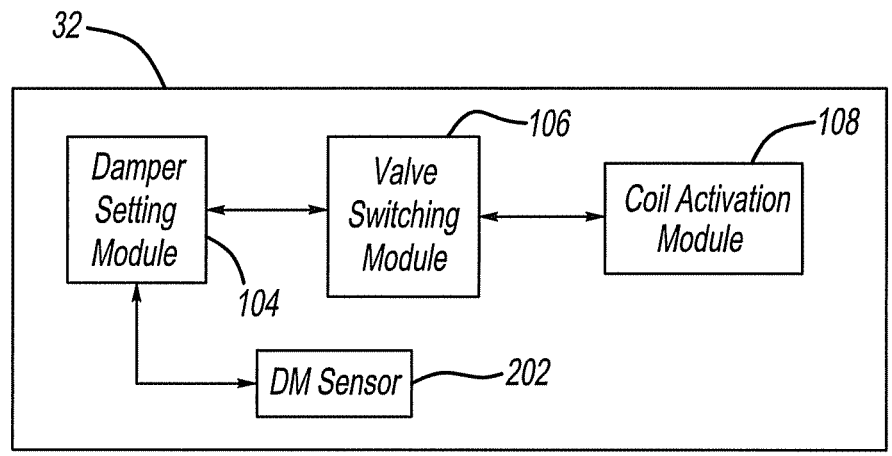
FIG - 13
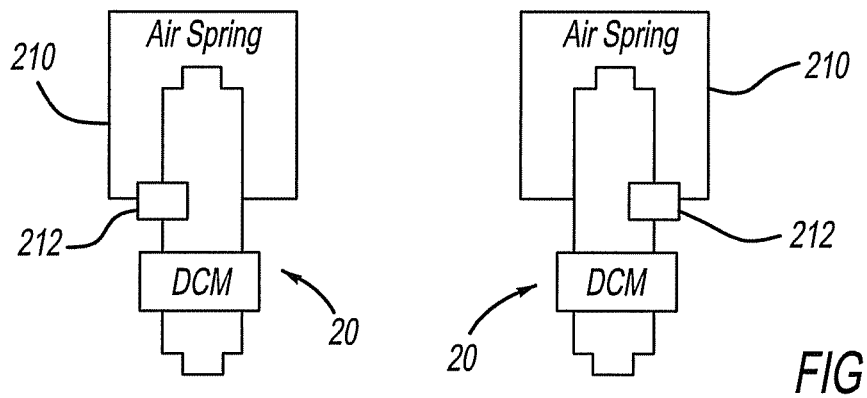
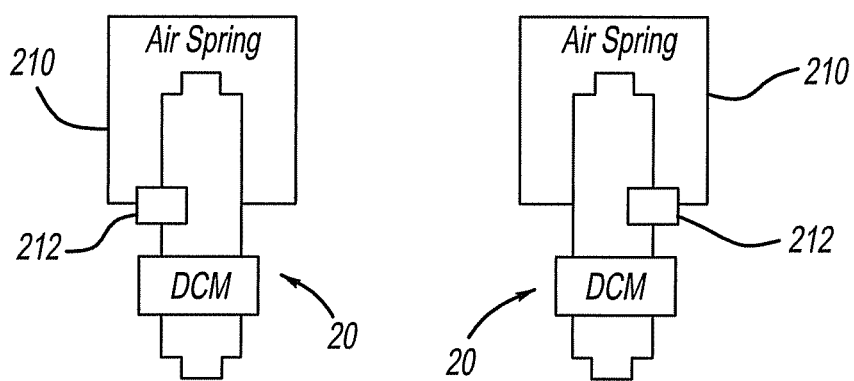
FIG - 14

AUTONOMOUS CONTROL DAMPER

CROSS-REFERENCE TO RELATED APPLICATIONS

This application claims the benefit of U.S. Provisional Application No. 61/770,426, filed on Feb. 28, 2013. The entire disclosure of the above application is incorporated herein by reference.

FIELD

The present disclosure relates to a hydraulic damper or shock absorber for use in a suspension system of a vehicle. More particularly, to a damper having autonomous control.

BACKGROUND

This section provides background information related to the present disclosure which is not necessarily prior art.

Shock absorbers are used in conjunction with automotive suspension systems to absorb unwanted vibrations which occur during driving. To absorb the unwanted vibrations, shock absorbers are generally connected between the sprung portion (body) and the unsprung portion (suspension) of the automobile.

In recent years, vehicles may be equipped with an electrically adjustable damping system that includes an adjustable shock absorber. Such adjustable shock absorbers typically include an electromechanical coil or solenoid disposed therein. A main control unit disposed within the vehicle is used to control a damping state of the adjustable shock absorber. More particularly, the main control unit receives data from various sensors disposed along the sprung and unsprung portions of the vehicle. Such sensors may include accelerometers, angular rate sensors, height sensors, and/or inertial measurement units. Based on the data received, the master control unit determines the damping state of the adjustable shock absorber and actuates the electromechanical coil/solenoid disposed within the shock absorber. Accordingly, each of the adjustable shock absorbers of the vehicle is controlled by the master control unit.

SUMMARY

This section provides a general summary of the disclosure, and is not a comprehensive disclosure of its full scope or all of its features.

The present disclosure provides for a damper system for a vehicle. The damper system includes an electrically adjustable hydraulic shock absorber and a damper control module. The damper control module is disposed with the shock absorber and is electrically coupled to the shock absorber. The damper control module determines a damping state of the shock absorber based on data received from a plurality of sensors. Furthermore, the damper control module controls the shock absorber, such that the shock absorber operates at the damping state.

In a feature of the disclosure, the damper control module may be disposed in a housing that is coupled to the shock absorber.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 4 is an enlarged partial cross-sectional view of a digital valve assembly disposed in the shock absorber as illustrated in FIG. 3;

FIG. 5 is an enlarged perspective view of a housing which houses the damper control module of the damper system;

FIG. 6 is an example functional block diagram of the damper system;

FIG. 7 is an example functional block diagram of the damper control module;

FIG. 8 illustrates an autonomous system having the damper system;

FIG. 13 is an example functional block diagram of the damper control module having DM sensors disposed thereon; and FIG. 14 illustrates an air spring integrated with the damper system.

Corresponding reference numerals indicate corresponding parts throughout the several views of the drawings.

DETAILED DESCRIPTION

Figure 1:
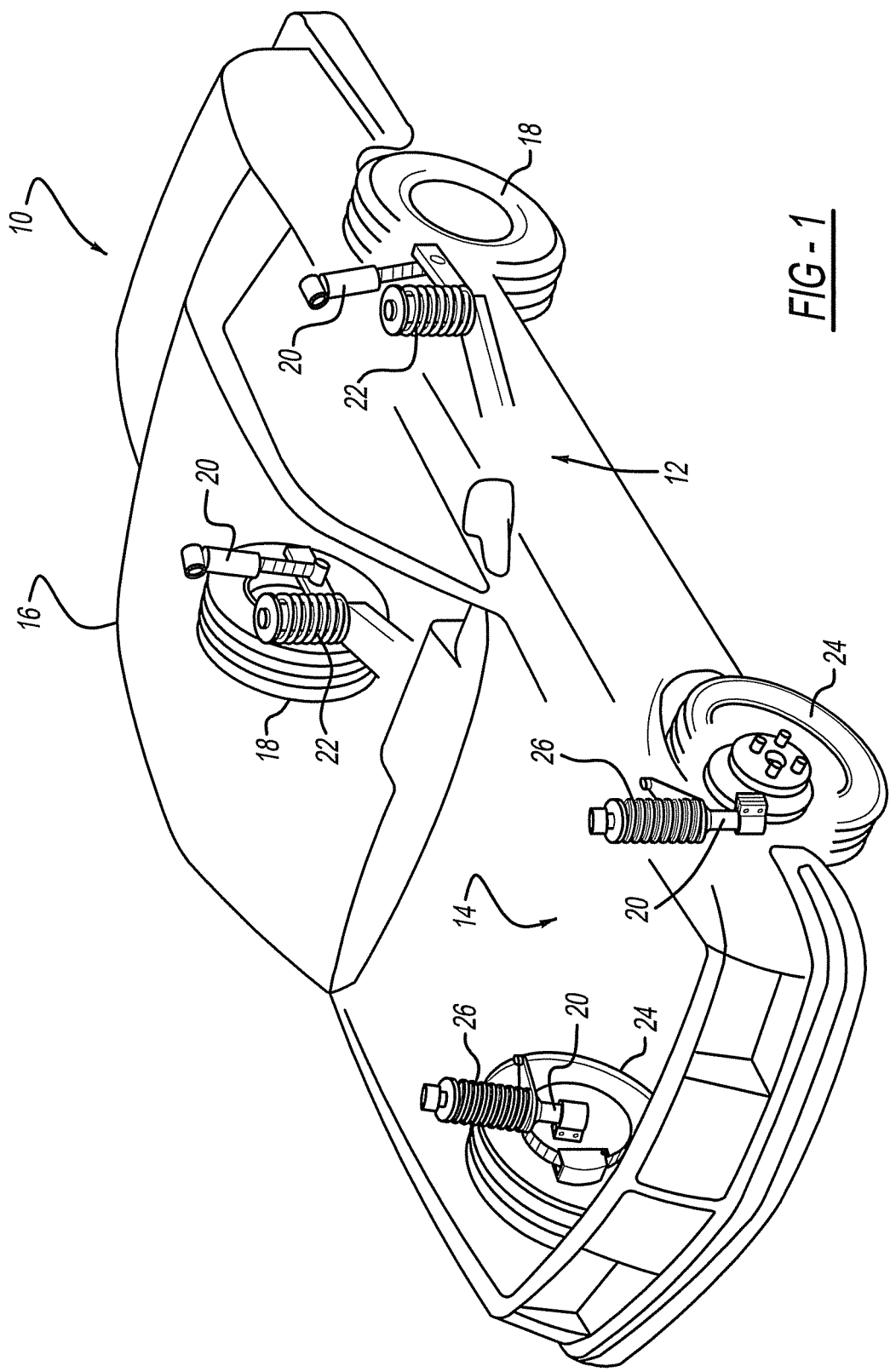
FIG. 1 is an illustration of a vehicle having a damper system which incorporates an electrically adjustable hydraulic shock absorber and a damper control module in accordance with the present disclosure.

The present disclosure will now be described more fully with reference to the accompanying drawings. With reference to FIG. 1, an example of a vehicle 10 incorporating a suspension system having autonomous controlled dampers is now presented. The vehicle 10 includes a rear suspension 12, a front suspension 14, and a body 16. The rear suspension 12 has a transversely extending rear axle assembly (not shown) adapted to operatively support a pair of rear wheels 18. The rear axle assembly is attached to the body 16 by means of a pair of damper systems 20 and by a pair of springs 22. Similarly, the front suspension 14 includes a transversely extending front axle assembly (not shown) to operatively support a pair of front wheels 24. The front axle assembly is attached to the body 16 by means of a pair of the damper systems 20 and by a pair of springs 26.

The damper systems 20 serve to dampen the relative motion of the unsprung portion (i.e., front and rear suspensions 12, 14) with respect to the sprung portion (i.e., body 16) of vehicle 10. While the vehicle 10 has been depicted as a passenger car having front and rear axle assemblies, the damper system 20 may be used with other types of vehicles or in other types of applications including, but not limited to, vehicles incorporating non-independent front and/or non-independent rear suspensions, vehicles incorporating independent front and/or independent rear suspensions or other suspension systems known in the art. In addition, the damper system 20 may also be used on all wheeled and/or tracked vehicles. For example the damper system 20 may be used on two and/or three wheels type vehicles, such as motorcycles and all-terrain vehicles.

Figure 2:
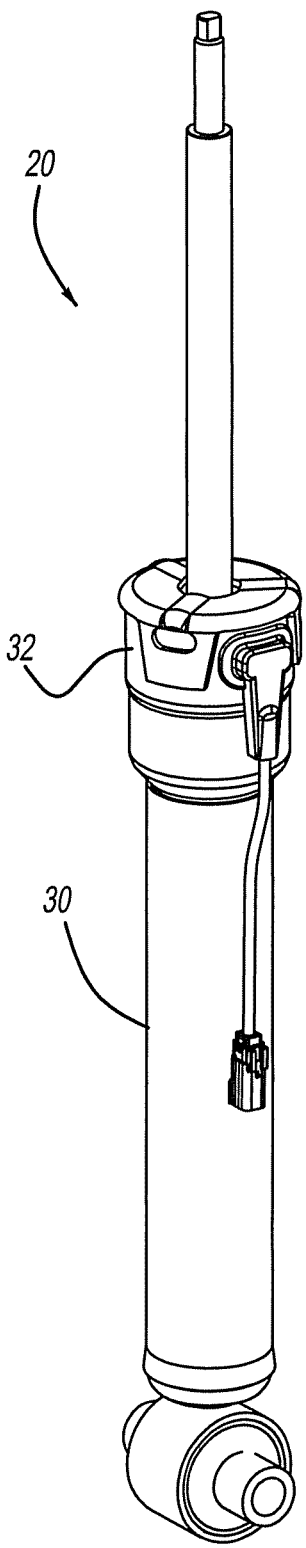
FIG. 2 is a perspective view of an example of the damper system.
Figure 3:
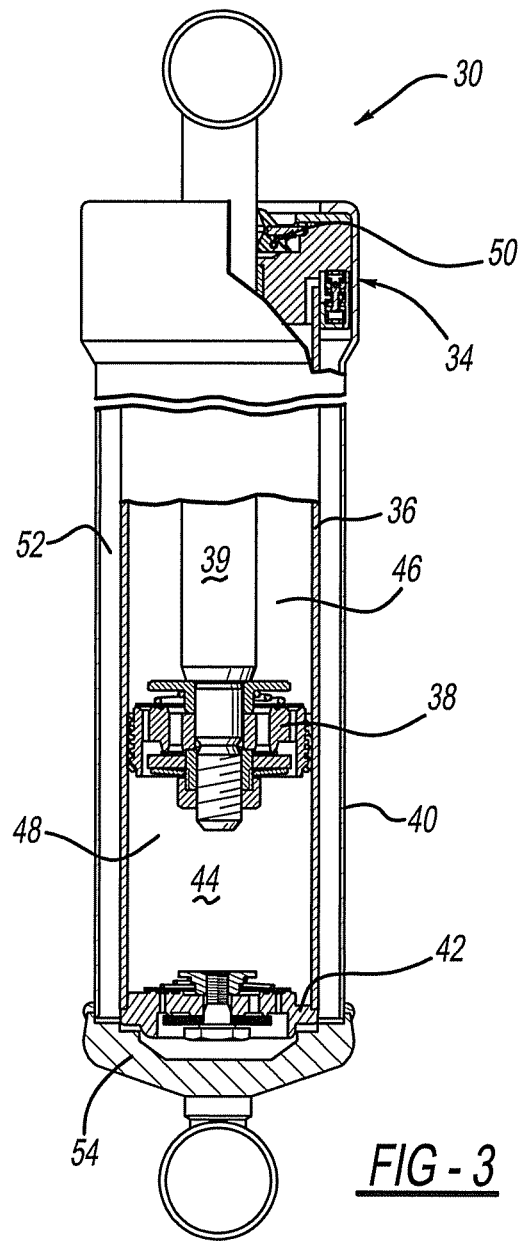
FIG. 3 is a partial cross-sectional view of the shock absorber of the damper system.

Referring now to FIGS. 2-3, an example of the damper system 20 is shown in greater detail. The damper system 20 includes an electrically adjustable hydraulic shock absorber 30 ("shock absorber 30" hereinafter) and a damper control module (DCM) 32. As shown in FIG. 3, the shock absorber 30 may have a twin tube configuration with one or more electro-mechanical valves. For example, in the example embodiment the shock absorber 30 may include one or more digital valve assemblies 34 disposed therein. The shock absorber 30 may include a pressure tube 36, a piston assembly 38, a piston rod 39, a reserve tube 40 and a base valve assembly 42.

In the example embodiment described herein, the damper system 20 is described and depicted as including a twin tube electrically adjustable hydraulic shock absorber. It is readily understood that the damper system 20 may include other types of electrically adjustable hydraulic shock absorber and is not limited to the shock absorber described herein. For example, the damper system 20 may include an electrically adjustable hydraulic shock absorber having a mono-tube configuration, a triple-tube configuration, or any other suitable shock absorber design known in the art. Furthermore, in the following description the shock absorber is connected to the sprung and unsprung portions of the vehicle as a non-inverted shock absorber. It is readily understood that the present disclosure is further applicable to inverted shock absorbers, which differ in the manner in which it is connected to the sprung and unsprung portions of vehicle. For example, the damping system 20 may include an inverted-mono-tube shock absorber.

The pressure tube 36 defines a working chamber 44. The piston assembly 38 is slidably disposed within the pressure tube 36 and divides the working chamber 44 into an upper working chamber 46 and a lower working chamber 48.

The piston rod 39 is attached to the piston assembly 38 and extends through the upper working chamber 46 and through a rod guide assembly 50 which closes the upper end of the pressure tube 36. The end of the piston rod 39 opposite to the piston assembly 38 is adapted to be secured to the sprung mass of the vehicle 10.

Valving within the piston assembly 38 controls the movement of fluid between the upper working chamber 46 and the lower working chamber 48 during movement of the piston assembly 38 within the pressure tube 36. Since the piston rod 39 extends through the upper working chamber 46 and not the lower working chamber 48, movement of the piston assembly 38 with respect to the pressure tube 36 causes a difference in the amount of fluid displaced in the upper working chamber 46 and the amount of fluid displaced in the lower working chamber 48. The fluid displaced may flow through the base valve assembly 42, the piston assembly 38, or a combination thereof.

The reserve tube 40 surrounds the pressure tube 36 to define a fluid reservoir chamber 52 located between tubes 40 and 36. The bottom end of the reserve tube 40 is closed by a base cup 54 which can be connected to the unsprung mass of vehicle 10. The upper end of reserve tube 40 is attached to the rod guide assembly 50. The base valve assembly 42 is disposed between the lower working chamber 48 and the reservoir chamber 52 to control the flow of fluid between chambers 48 and 52. When the shock absorber 30 extends in length, an additional volume of fluid is needed in the lower working chamber 48. Thus, fluid may flow from the reservoir chamber 52 to the lower working chamber 48 through, for example, the base valve assembly 42. When shock absorber 30 compresses in length, an excess of fluid must be removed from the lower working chamber 48, and therefore, fluid may flow from the lower working chamber 48 to the reservoir chamber 52 through the base valve assembly 42, the piston assembly 38, or a combination thereof.

With reference to FIG. 4, the electrically adjustable shock absorber 30 includes an electro-mechanical valve, such as the digital valve assembly 34. While the shock absorber is described as including a digital valve assembly as the electro-mechanical valve, the shock absorber may include other types of electro-mechanical valves, such as a variable state valve that may be provided as a solenoid or other suitable electro-mechanical valves known in the art, and is not limited to the digital valve assembly described herein.

The digital valve assembly 34 is a two position valve assembly which has a different flow area in each of the two positions. The digital valve assembly 34 may include a valve housing 60, a sleeve 62, a spool 64, a spring 66, and a coil assembly 68. The valve housing 60 defines a valve inlet 70 which is in communication with the upper working chamber 46 through a fluid passage (not shown) and a valve outlet 72 which is in fluid communication with the reservoir chamber 52.

The sleeve 62 is disposed within the valve housing 60. The sleeve 62 defines an annular inlet chamber 74 which is in communication with the valve inlet 70 and a pair of annular outlet chambers 76 and 78 which are in communication with valve outlet 72.

The spool 64 is slidingly received within the sleeve 62 and axially travels within the sleeve 62 between the coil assembly 68 and a stop puck 80 disposed within the sleeve 62. The spring 66 biases the spool 64 away from the coil assembly 68 and towards stop puck 80. A shim 82 is disposed between coil assembly 68 and the sleeve 62 to control the amount of axial motion for the spool 64.

The spool 64 defines a first flange 84 which controls fluid flow between the annular inlet chamber 74 and the annular outlet chamber 76 and a second flange 86 that controls fluid flow between the annular inlet chamber 84 and the annular outlet chamber 78. The flanges 84 and 86 thus control fluid flow from the upper working chamber 46 to the reservoir chamber 52.

The coil assembly 68 is disposed within the sleeve 62 to control the axial movement of the spool 64. The wiring connections for the coil assembly 68 can extend through a rod guide housing (not shown), through the sleeve 62, through valve housing 60 and/or through the reserve tube 40. When there is no power provided to the coil assembly 68, the damping characteristics will be defined by the flow area of the digital valve assembly 34 in its first position, the piston assembly 38 and the base valve assembly 42.

The movement of spool 64 is controlled by supplying power to coil assembly 68 to move the digital valve assembly 34 to its second position. The digital valve assembly 34 can be kept in its second position by continuing to supply power to the coil assembly 68 or by providing means for retaining digital valve assembly 34 in its second position and discontinuing the supply of power to the coil assembly 68. The means for retaining the digital valve assembly 34 in its second position can include mechanical means, magnetic means or other means known in the art.

Once in its second position, movement to the first position can be accomplished by terminating power to the coil assembly 68 or by reversing the current or reversing the polarity of the power supplied to the coil assembly 68 to overcome the retaining means. The amount of flow through the digital valve assembly 34 has discrete settings for flow control in both the first position and the second position. While the present disclosure is described using one digital valve assembly 34, it is within the scope of the disclosure to use a plurality of digital valve assemblies 34 having different discrete settings for flow control in its first and second position.

In operation, fluid will flow through the digital valve assembly 34 both during a rebound or extension stroke and during a compression stroke. During a rebound or extension stroke, fluid in the upper working chamber 46 is pressurized which then forces fluid flow through the digital valve assembly 34 when it is opened. During a compression stroke, fluid flows from the lower working chamber 48 to the upper working chamber 46 through the piston assembly 38. When the digital valve assembly 34 is opened, an open flow path between the upper working chamber 46 and the reservoir chamber 52 is created. Additional fluid flow will flow through the piston assembly 38 and through the digital valve assembly 34 because this open flow path creates the path of least resistance to the reservoir chamber 52 in comparison to flow through the base valve assembly 42. While in the example embodiment the digital valve assembly 34 is positioned at or near the rod guide assembly 50 of the shock absorber 30, the digital valve assembly 34 may be positioned at other locations within the shock absorber.

With reference to FIGS. 5-6, an example of the DCM 32 is presented. The DCM 32 includes a microprocessor 32a and is disposed at the electrically adjustable shock absorber 30 in a housing 100. The DCM 32 controls the damping characteristics of the shock absorber 30 by controlling the actuation of the electro-mechanical valve disposed within the shock absorber 30. Accordingly, each damper system 20 includes a microprocessor based DCM that adjusts the damping characteristics of the damper system 20, as described in further detail below.

The DCM 32 receives a damper setting from an electronic control associated with the vehicle, along with data from various sensors 102 disposed either on or near the shock absorber 30. The sensors 102 may be disposed on the sprung and/or the unsprung portions of the vehicle 10. The sensors 102 may include an angular rate sensor, an inertial measurement unit (IMU), a temperature sensor, a height sensor, a pressure sensor, an accelerometer, tri-axial acceleration sensor, potentiometer, GPS/tracking sensor and other suitable sensors that provide data used for controlling the damping characteristics of the shock absorber 30.

The DCM 32 utilizes the data from the sensors 102 to autonomously control the electro-mechanical valve, such as the digital valve assembly 34. For example, with reference to FIG. 7, the DCM 32 includes a damper setting module 104, a valve switching module 106, and a coil activation module 108.

The damper setting module 104 determines a damping state of the shock absorber 30 based on information received from the sensors 102. More particularly, the damper setting module 104 decodes a desired damper setting input which it receives and determines a target damping state of the shock absorber 30. The damper setting module 104 may also diagnose and/or detect faults of the sensors 102 based on the data received, and invoke a predetermined operation state if such a failure is detected or persists. Alternatively, the damper setting module 104 may have the damper system 20 produce an audible signal or send serial data in the event of a fault.

Based on the type of failure, the predetermined operation state can be an electrically controlled default state or mechanically defined no power state or preset valve positions. For example, the failure could be an electrical failure (e.g., coil short), a failure of sensors/inputs (e.g., sensor signal out of range), a control system failure, or a mechanical/damper failure. Information regarding the failure status of a damper and its predetermined operation state may be shared with other damper systems 20 via a serial data communication network, as described below. Information regarding the failure status may also be provided to a user of the vehicle. For example, information regarding the failure status may be sent to a device disposed in the passenger cabin, such as a display and/or speakers, and a message regarding the failure may be displayed on the display and/or projected through the speaker as an audible message.

The damper setting module 104 may utilize known skyhook control to isolate/dampen movement of the body 16 of the vehicle 10. Specifically, the damper setting module 104 may use skyhook theory to adjust the damping characteristics of the shock absorber 30 based on relative velocities of the body 16 and wheel. Alternatively, the damper setting module 104 may utilize a form of dynamic damping ratio body control in which the damping state is proportional to the vehicle body velocity. It would be appreciated by one skilled in the art that while skyhook control and/or dynamic damping ratio body control can be used, other suitable control algorithms may be implemented as the damper setting module 104.

Using the damping state determined by the damper setting module 104, the valve switching module 106 determines the state of the electro-mechanical valve for achieving the damping state. For example, in the example embodiment, the valve switching module 106 determines if the damping state received requires the activation/deactivation of the digital valve assembly 34. Similarly, if multiple digital valve assemblies 34 are disposed within the shock absorber 30, the valve switching module 106 determines the appropriate activation/deactivation of each of the digital valve assemblies 34. Accordingly, the valve switching module 106 determines whether the coil assembly 68 is to receive power based on whether the digital valve assembly 34 is to be in the first position or second position.

Based on the control signal from the valve switching module 106, the coil activation module 108 controls the electrical power provided to the electro-mechanical valve. For example, the coil activation module 108 may either transmit a charge to the coil assembly 68 of the digital valve assembly 34, or remove a charge currently being supplied to the coil assembly 68. Specifically, the digital valve assembly 34 of the shock absorber 30 is electrically coupled to the coil activation module 108 via the coil assembly 68. The coil activation module 108 generates the electric power necessary to set the digital valve assembly 34 (i.e., the electro-mechanical valve) to the desired position identified by the valve switching module 106. For example, if the valve switching module 106 determines that the digital valve assembly 34 should be set to a first position, the coil actuation module 108 does not supply power to the digital valve assembly 34. On the other hand, if the valve switching module 106 determines that the digital valve assembly 34 should be set to a second position, the coil actuation module 108 supplies power to the digital valve assembly 34.

In operation, the DCM 32 independently controls the damping state of the electrically adjustable shock absorber 30. Specifically, the DCM 32 receives data from sensors 102 disposed at or near the shock absorber 30. The DCM 32 may receive additional information from sensors disposed on the vehicle body, sensors disposed at other damper systems, and/or information from a vehicle network, as described below. Based on the data received, the DCM 32 adjusts the damping characteristics of the shock absorber 30 by determining the appropriate damping state of the shock absorber 30 and controlling the electro-mechanical valve disposed within the shock absorber.

With reference to FIG. 8, with each damper system 20 configured as a fully-integrated self-adjustable damper, the vehicle 10 may have an autonomous system 150. The autonomous system 150 includes four damper systems 20 (referenced as 20A, 20B, 20C, 20D in FIG. 8) disposed at each corner of the vehicle. Each of the damper systems 20 is controlled by its respective DCM 32. For example, each DCM 32 receives data from the sensors 102 disposed at or near the shock absorber 30, determines the damping state of its shock absorber 30, and controls the electro-mechanical valve(s) disposed in the shock absorber 30.

The autonomous system 150 may not be in communication with a vehicle communication network of the vehicle and may not receive data from other sensors disposed along the vehicle including the sprung mass. The autonomous system 150 may only be coupled to a power source (not shown) which provides power to the DCM 32.

The autonomous system 150 utilizes the fully integrated adjustable dampers as independent damping systems located at each corner of the vehicle 10. Accordingly, if one of the damper systems 20, experiences a malfunction, the damper system 20 may be replaced and/or repaired without affecting the other damper systems 20.

Figure 9:
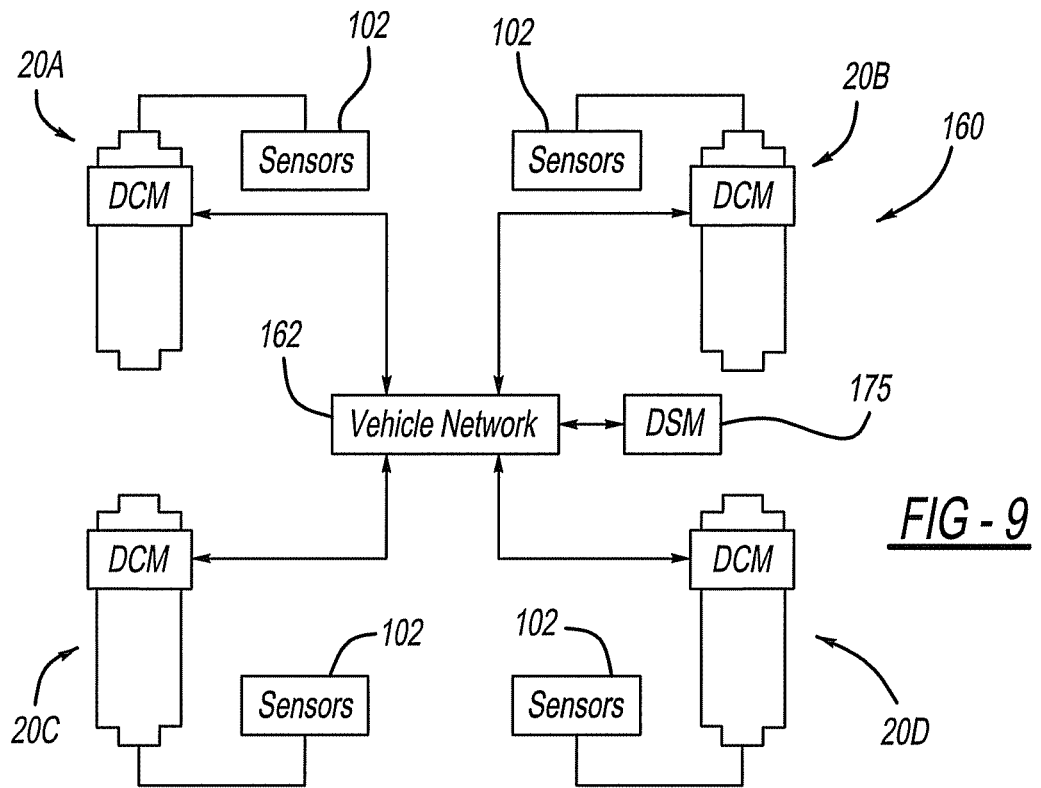
FIG. 9 illustrates a vehicle-linked autonomous system having the damper system coupled to a vehicle network.

With reference to FIG. 9, to further improve the damping characteristics of the damper systems 20, the vehicle 10 may have a vehicle-linked autonomous system 160. Similar to the autonomous system 150, the vehicle-linked autonomous system 160 also includes four damper systems 20 (referenced as 20A, 20B, 20C, 20D in FIG. 9) where each damper system 20 is controlled by its respective DCM 32. In addition, the vehicle-linked autonomous system 160 is in communication with a serial data communication network, such as a vehicle network 162. The vehicle network 162 may be a controller area network (CAN) (also known as car area network), a local interconnect network (LIN), or other suitable communication networks for a vehicle that establishes a communication link. The vehicle network 162 may also be configured as a wireless communication system, such that each DCM 32 may include a wireless transceiver.

Each DCM 32 may be communicably coupled to the vehicle network 162. The DCM 32 may receive information from other modules disposed in the vehicle 10 via the vehicle network 162. For example, the DCM 32 may receive information from a driver select module (DSM) 175 via the vehicle network 162. Specifically, the DSM 175 provides information regarding the driver select mode of the vehicle. The driver select mode may be set by the user via a user interface. The user interface may be disposed in the passenger cabin as, for example, a button, a touch input on a display screen, or other suitable interfaces known in the art. The user interface may also be part of a software application disposed on a portable computing device such as a mobile phone, thereby allowing the user to input the driver select mode via the device. The driver select mode allows the user to select from different handling and response settings, which may be defined as sport, comfort, normal, etc.

Based on the data from the sensors 102 and the information from the vehicle network 162 which may include the driver select mode, the DCM 32 determines the damping state of the shock absorber 30. In addition to receiving information, each DCM 32 of the vehicle-linked autonomous system 160 may also transmit information to other modules. For example, the DCM 32 may transmit diagnostic information to a vehicle control module (not shown) which stores such information.

Figure 10:
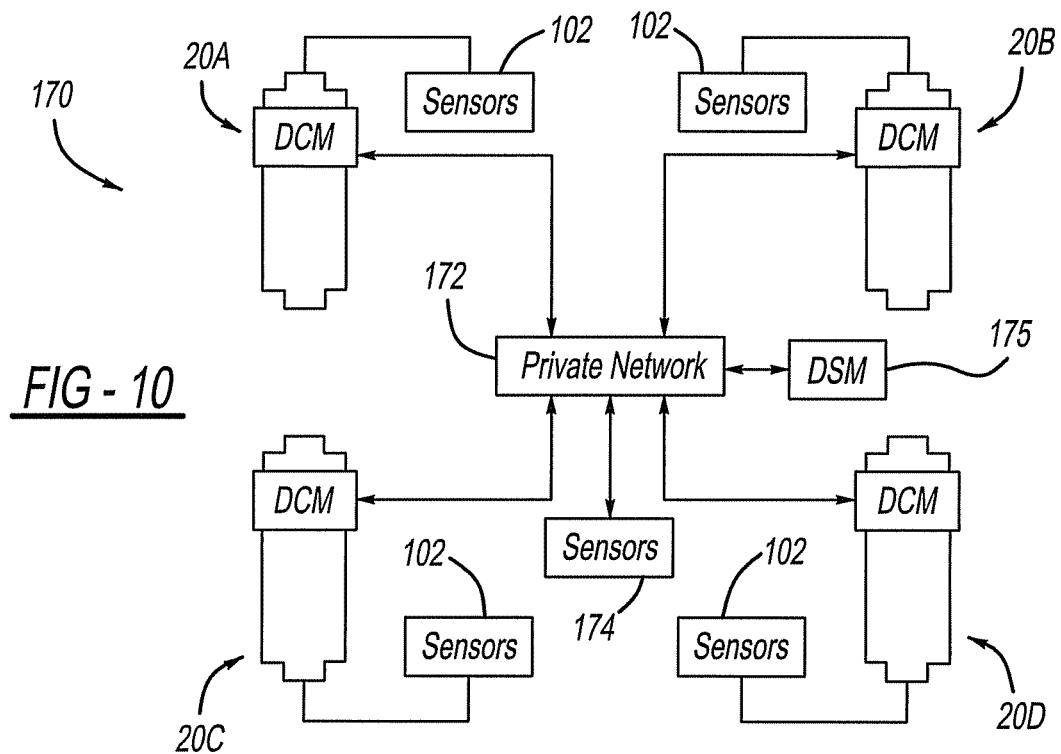
FIG. 10 illustrates a private-linked autonomous system having the damper system coupled to a private network.

In another variation, as shown in FIG. 10, the vehicle 10 may include a private-linked autonomous system 170. Similar to autonomous systems 150 and 160, the private-linked autonomous system 170 includes four damper systems 20 (referenced as 20A, 20B, 20C, 20D in FIG. 10) where each damper system 20 is controlled by its respective DCM 32.

The private-linked autonomous system 170 includes a private network 172 (a serial data communication network) which establishes a data communication link between the damper systems 20. For example, the private network 172 may be configured as a wired or wireless communication system, where as a wireless communication system each DCM 32 would include a wireless transceiver (not shown). Accordingly, the damper systems 20A, 20B, 20C, and 20D may communicate with each other via the private network 172. For example, the DCM 32 of damper system 20A may use data from sensors 102 disposed at damper systems 20B, 20C, 20D.

Each DCM 32 may also receive data from supplementary sensors 174 and/or the DSM 175 via the private network 172. The supplementary sensors 174 may be disposed at the sprung portion of the vehicle 10, and may transmit data to the damper systems 20 via the private network 172. The DSM 175 which is coupled to the private network 172 provides the driver select mode selected by the user to the DCM 32. Alternatively, the DSM 175 may be directly coupled to each DCM 32 via a direct serial data communication link.

Furthermore, the damper systems 20 may also exchange data with an external device (not shown) via the private network 172. For example, the damper systems 20 may communicate with a service tool that is coupled to the private network 172. The damper systems 20 may transmit information related to faults or failures detected by the DCM 32 to the service tool. The service tool may use such information to perform diagnostics on the damper systems 20.

Figure 11:
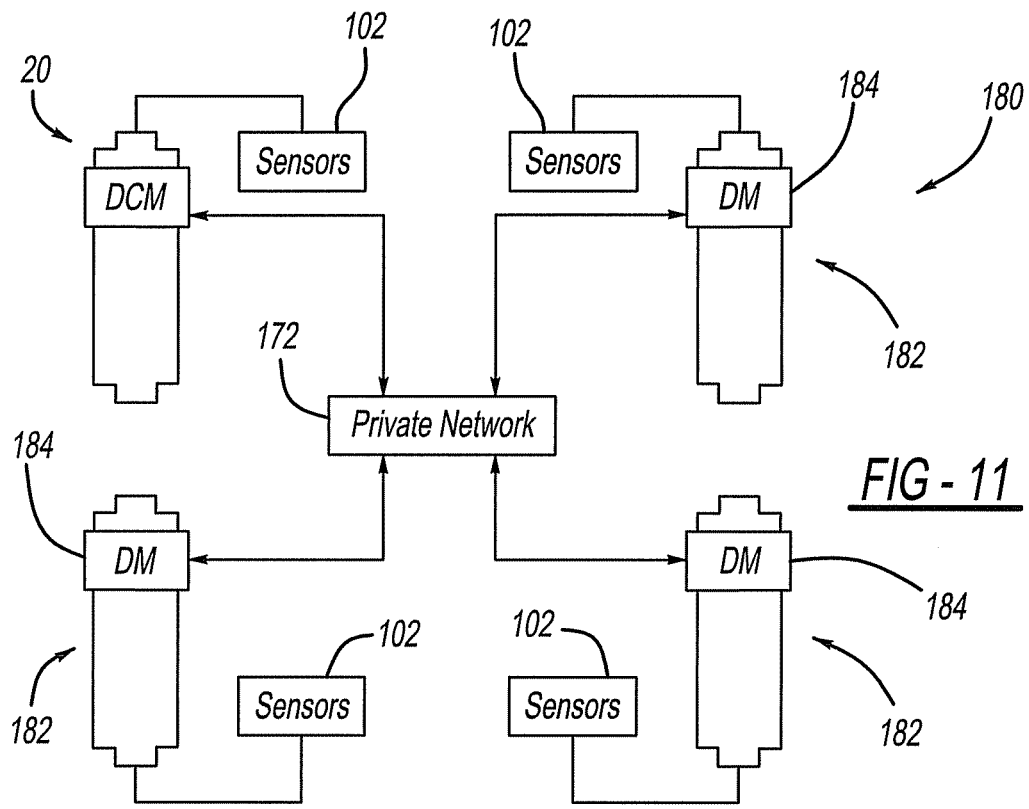
FIG. 11 illustrates a partial-autonomous system having the damper system in which one damper system is a master and the other damper systems are slaves.

With reference to FIG. 11, the vehicle 10 may include a partial autonomous system 180 in which one damper system controls the other damper systems. For example, the partial autonomous system 180 includes one damper system 20 which includes the DCM 32, and three damper systems 182. The main difference between the damper system 20 and the damper system 182 is that the damper system 182 does not include the damper setting module 104. Accordingly, the damper system 182 includes the shock absorber 30 and a damper module 184. The damper module 184 is similar to the DCM 32 except it does not include the damper setting module 104. The damper system 20 and the damper system 182 are in communication via the private network 172.

The partial autonomous system 180 utilizes the damper system 20 as a master damper and the damper systems 182 as the slave dampers. The master damper receives data from the sensors 102 disposed at the slave dampers. Based on the data received, the master damper determines a damping state for each of the slave dampers and transmits the damping state via the private network 172.

The partial autonomous system 180 provides a fully integrated vehicle subsystem for controlling the damping characteristics of the damper systems by way of a master damper. The overall cost of the partial autonomous system 180 may be less than the systems 150, 160, 170 since only one damper system has the damper setting module.

Figure 12:
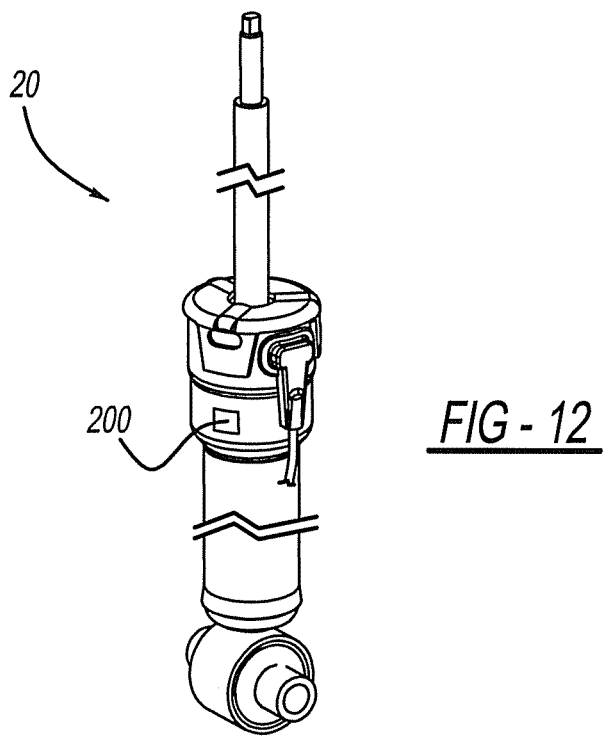
FIG. 12 illustrates a three-axis accelerometer disposed at the damper system.

As provided above, each damper system 20 includes a set of sensors 102 disposed at or near the shock absorber 30. With reference to FIG. 12, one of the sensors 102 may be a three-axis accelerometer 200 disposed at the shock absorber 30. The three-axis accelerometer 200 may be located at the sprung or the unsprung portion the shock absorber 30. The three-axis accelerometer 200 detects the fore-aft and lateral acceleration being experienced by the shock absorber 30. The fore-aft acceleration is typically due to the braking/acceleration of the vehicle, and the lateral acceleration is due to the steering or cornering. The three-axis accelerometer 200 may utilize calibration algorithms to correct axis mounting orientations and location, and to filter out noise. The DCM 32 may use the accelerations detected to mitigate the pitch and roll of the body 16 of the vehicle 10.

While the three-axis accelerometer 200 may be disposed at each shock absorber 30 to provide data to the DCM 32, one three-axis accelerometer 200 may be used to provide data to all four damper systems. For example, if the damper systems 20 are in communication via the vehicle network 162 or the private network 172, as described above, the three axis accelerometer 200 may transmit the accelerations to its DCM 32 which transmits it to other damper systems 20 via the vehicle network 162 or private network 172.

By utilizing the three-axis accelerometer 200, the damper systems 20 are able to control the pitch and roll of the vehicle without using information from other modules. For example, the damper systems 20 may no longer depend upon steering, braking, and/or acceleration information provided by other modules in the vehicle 10. In addition, one sensor may be used instead of three separate accelerometers for detecting fore-aft and lateral accelerations, thereby reducing the overall cost of the damper system 20.

Along with the sensors 102, the damper system 20 may also include sensors disposed with the DCM 32. For example, with reference to FIG. 13, the DCM 32 may include a damper module (DM) sensor 202. The DM sensor 202 may be one or more sensors disposed within the housing 100 with the DCM 32. More particularly, the DM sensor 202 may be integrated with the circuit board on which the DCM 32 is disposed. Accordingly, FIG. 13 depicts the DM sensors 202 as part of the DCM 32. If the damper system 20 is coupled to a network such as the vehicle network 162 or private network 172 the DM sensors 202 may transmit data to other vehicle modules and/or damper systems 20 via the network 162, 172.

The DM sensor 202 may include, for example, an accelerometer and/or a temperature sensor. The accelerometer may be a one-axis accelerometer for detecting lateral acceleration. The accelerometer may provide data to the damper setting module 104. The temperature sensor detects a temperature of the housing 100 within which the DCM 32 is disposed. The DM sensors 202 further enable autonomous control of the damper system 20. Specifically, the DM sensors 202 provide data to the damper setting module 104 which controls the damping state of the shock absorber. In addition, the DM sensors 202 further improve packaging of the damper system 20 by removing wiring between the DM sensor 202 and the DCM 32.

Using sensors disposed at the DCM 32 and the sensors 102, the damper setting module 102 may optimize the performance of the damper system 20. For example, the damper setting module 104 may include a temperature control logic. The temperature control logic may compensate for variation in damper performance due to fluctuation in damper temperature. For example, the DCM 32 may receive data from one or more temperature sensors that detect the temperature of the shock absorber 30, the fluid within the shock absorber 30, or the temperature of other components which may influence the performance of the damper system 20. In addition, if the DM sensor 202 includes the temperature sensor, the damper setting module 104 may account for the environment within the housing 100 when determining the damping state.

The temperature control logic of the damper setting module 104 may be provided as predefined algorithms that compensate for variation in the performance of the damper system 20 due to the fluctuation in temperature. The temperature control logic may estimate the temperature of the damper system 20 which includes the fluid within the shock absorber 30. The damper setting module 104 may then optimize the performance of the shock absorber 30 by selecting a damping state in which the damper system 20 does not exceed its maximum temperature. For example, when temperature of the damper system 20 is close to a maximum temperature, the damper setting module 104 may have the damping state set to a predetermined damper state that would assist in reducing the temperature of the damper system 20. More particularly, the system 20 may be automatically switched off, such that the shock absorber 30 is maintained at a predetermined damper state until the temperature of the damper system 20 reduces to a preset threshold. It would be appreciated by one skilled in the art that the damper setting module 104 may factor other conditions when determining the damping state of the shock absorber and is not limited to the conditions described herein. For example, the damper setting module 104 may include a speed sensitive damping logic which adjusts the damping characteristics of the shock absorber based on the speed of the vehicle which can be detected by the GPS sensor.

In the example embodiment, the suspension system of the vehicle utilizes the damper system 20 and the spring 22 for coupling the rear and front assemblies to the vehicle 10. The damper system 20 may also be integrated with other suspension systems and still provide autonomous control. For example, in lieu of the spring 22, 26, the vehicle 10 may include an air spring for supporting and coupling the vehicle 10 to the wheels 18, 24. For example, with reference to FIG. 14, an air spring 210 may be arranged around the damper system 20. The air spring 210 may include a pressure sensor 212 for detecting the pressure of the air spring 210.

As known in the art, the air spring 210 may be fit to a vehicle suspension to replace a mechanical coil or leaf spring to support the body 16 of the vehicle 10. Using a pressurized air supply, the amount and pressure of the supplied air within the confined volume of the air spring 210 provides the ability to adjust the nominal spring force and spring rate of the air spring 210.

The DCM 32 may receive data from the pressure sensor 212 of the air spring 210 and adjust the damping characteristics of the shock absorber 30 based on the information from the pressure sensor 212 and the sensors 102. For example, the damper setting module 104 of the DCM 32 may include a pressure control logic. The pressure control logic may be provided as a set of algorithms as part of the damper setting module 104. The pressure control logic accounts for the support provided by the air spring 210 by utilizing the data from the pressure sensor 212. Accordingly, the damper setting module 104 adjusts the damping state based on the variation in pressure of the air spring 210. The pressure control logic may also be configured to detect an air spring malfunction based on the data from the pressure sensor 212.

While the present disclosure focuses on the use of an air-spring having only pressurized air supply, the disclosure may also be applicable to other types of air springs, such as a combination of air spring suspension and mechanical. Furthermore, the air spring 210 and/or the pressure sensor 212 may be arranged in other suitable manner with the damper system 20, and are not limited to arrangement depicted in the figure. For example, the air spring may be arranged separately from the damper system 20 with the pressure sensor 212 pneumatically connected to the air spring 210 via an air-line. Furthermore, the pressure sensor 212 may be disposed with the DCM 32 as a DM sensor. Accordingly, the pressure sensor may be coupled to the air spring 210 via an air-line, thereby detecting the pressure of the air spring which may be positioned at or separately from the damper system 20.

As provided above, the damper system may be integrated with various types of suspension systems. The damper system is a fully integrated system having the electrically adjustable hydraulic shock absorber and the DCM. The damper system performs autonomous control of the shock absorber and eliminates the need for a central control unit, thereby reducing the complexity of the overall suspension system of the vehicle.

While the present disclosure is described with regards to an electrically adjustable hydraulic shock absorber that includes an electromechanical valve, it is readily understood that the present disclosure is applicable to other types of electrically adjustable hydraulic shock absorbers that may not include an electromechanical valve. For example, the present disclosure is also applicable to an electrically adjustable hydraulic shock absorber that uses magneto-rheological and electro-rheological damping technologies. Accordingly, the damping control module determines a damping state of the shock absorbers and operates the shock absorbers to such damping state using known methods that utilize the magneto-rheological and electro-rheological damping technologies.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

In this application, including the definitions below, the term module may be replaced with the term circuit. The term module may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by a processor; other suitable hardware components that provide the described functionality; or a combination of some or all of the above, such as in a system-on-chip.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof.

When an element is referred to as being "on," "engaged to," "connected to," or "coupled to" another element, it may be directly on, engaged, connected or coupled to the other element, or intervening elements may be present. In contrast, when an element is referred to as being "directly on," "directly engaged to," "directly connected to," or "directly coupled to" another element, there may be no intervening elements present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements and/or components, these elements and/or components should not be limited by these terms. These terms may be only used to distinguish one element or component from another. Terms such as "first," "second," and other numerical terms when used herein do not imply a sequence or order unless clearly indicated by the context. Thus, a first element or component discussed could be termed a second element or component without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A damper system for a vehicle comprising:
an electrically adjustable hydraulic shock absorber having:
a pressure tube forming a working chamber and containing a working fluid within the working chamber;
a reserve tube surrounding said pressure tube and forming a reservoir chamber;
the shock absorber having a first end;
a rod guide disposed at the first end;
the shock absorber having a second end opposite to the first end of the shock absorber;
a base valve assembly disposed at the second end within the pressure tube for communicating the working fluid between the working chamber and the reservoir chamber;
a piston supported from a piston rod;
a plurality of two position electro-mechanical valves which have a different flow area in each of the two positions, the plurality of electro-mechanical valves being disposed within the shock absorber adjacent to the first end, the plurality of electro-mechanical valves further being disposed remote from the piston and laterally offset from the piston and operable to communicate portions of the working fluid between the working chamber and the reservoir chamber; and
a damper control module forming a portion of the shock absorber and contained within a housing at the first end of the shock absorber adjacent the rod guide, the damper control module including a circuit board having damper setting logic determining a target damping state of the shock absorber based on data received from a plurality of sensors mounted on the shock absorber, wherein the only electrical inputs to the shock absorber include a power input and the data from the plurality of sensors, wherein the circuit board also includes valve switching logic determining a present state of each one of the plurality of electro-mechanical valves and coil activation logic controlling power to the plurality of electro-mechanical valves based on a comparison of the target damping state to the present state of each one of the plurality of electro-mechanical valves to thus control flow of the working fluid between the working chamber and the reservoir chamber, and thus to control the damping state of the shock absorber.

2. The damper system of claim 1 wherein the plurality of sensors includes a three-axis accelerometer disposed at the shock absorber.

3. The damper system of claim 1 further comprising:
a damper sensor disposed with the damper control module, wherein the damper control module determines the damping state based on data from the damper sensor and the plurality of sensors.

4. The damper system of claim 1 wherein:
the damper control module is coupled to each one of the plurality of electro-mechanical valves.

5. A vehicle system comprising:
a body;
a suspension system; and
the damper system of claim 1, wherein the damper system couples the suspension system to the body.

6. A damper system for a vehicle comprising:
an electrically adjustable hydraulic shock absorber, the shock absorber including:
a first end and a second end opposite the first end;
a rod guide at the first end;
a pressure tube defining a working chamber for holding a working fluid;
a reserve tube surrounding the pressure tube to define a reservoir chamber between the reserve tube and the pressure tube;
a base valve disposed at the second end and communicating portions of the working fluid between the working chamber and the reservoir chamber;
a piston rod and a piston supported from the piston rod;
a damper control module disposed within a housing of the shock absorber at the first end adjacent to the rod guide, and electrically coupled to the shock absorber;
the damper control module communicating with an electrically actuatable valve disposed remote from the piston and laterally offset from the piston rod, for communicating portions of the working fluid between the working chamber and the reservoir chamber, and being operable to determine a target damping state of the shock absorber based on data received from a plurality of sensors disposed in proximity of the shock absorber, and to control actuation and de-actuation of the electrically actuatable valve, to thus control the shock absorber such that the shock absorber operates at the target damping state, wherein the only electrical inputs to the shock absorber include a power input and data from the plurality of sensors.

7. The damper system of claim 6 wherein the damper control module receives data regarding a temperature of the shock absorber from one of the plurality of sensors, and the damper control module adjusts the target damping state of the shock absorber based on the temperature received.

8. The damper system of claim 6 further comprising:
a damper sensor disposed with the damper control module, wherein the damper control module determines the target damping state based on data from the damper sensor and the plurality of sensors.

9. The damper system of claim 6 wherein the vehicle includes an air spring and a pressure sensor that detects a pressure of the air spring, and the damper control module adjusts the target damping state of the shock absorber based on data from the pressure sensor.

10. A vehicle system comprising:
a plurality of the damper systems of claim 6; and
a communication network communicably coupling the plurality of the damper systems.

11. A vehicle system comprising:
a plurality of the damper systems of claim 6, wherein the plurality of the damper systems includes one master damper system and a slave damper system; and
a communication network communicably coupling the master damper system and the slave damper system, wherein:
the master damper system determines a slave damping state of the shock absorber of the slave damper system and transmits the slave damping state to the slave damper system via the communication network; and
the slave damper system controls the shock absorber based on the slave damping state received.

12. A damper system for a vehicle comprising:
an electrically adjustable hydraulic shock absorber having:
a rod guide assembly;
a pressure tube operably coupled to the rod guide assembly to form a working chamber that contains a working fluid therein;

a reserve tube disposed around the pressure tube to define a reservoir chamber between the pressure tube and the reserve tube;

a piston rod and a piston supported from the piston rod;

the electrically adjustable hydraulic shock absorber further including a plurality of electro-mechanical valves disposed within the shock absorber remote from the piston and each being laterally offset from the piston rod, the electro-mechanical valves controlling fluid flow between the working chamber and the reservoir chamber; and a damper control module disposed within a housing at the shock absorber and in communication with the plurality of electro-mechanical valves, wherein the damper control module includes a circuit board including dedicated damper setting logic, wherein the damper setting logic determines a target damping state of the shock absorber based on data received from a plurality of sensors disposed in proximity of the shock absorber, the circuit board also including power drive electronics for controlling power to each one of the plurality of electro-mechanical valves, such that the shock absorber operates at the target damping state, wherein the only electrical inputs to the shock absorber include a power input and data from the plurality of sensors.

13. The damper system of claim 12 wherein the plurality of sensors includes sensors disposed at the shock absorber.

14. The damper system of claim 12 wherein the plurality of electro-mechanical valves comprises a plurality of on/off, two position valves.

15. An autonomous damping system for a vehicle comprising:

an electrically adjustable hydraulic shock absorber having:

a pressure tube forming a working chamber and containing a working fluid within the working chamber;

a reserve tube surrounding said pressure tube and forming a reservoir chamber;

a base valve assembly disposed within the pressure tube for communicating the working fluid between the working chamber and the reservoir chamber;

a piston supported from a piston rod;

a sensor disposed at the shock absorber;

an electro-mechanical valve disposed within the shock absorber remote from the piston and operable to communicate portions of the working fluid between the working chamber and the reservoir chamber; and a damper control module housed within a housing of the shock absorber and forming a portion of the shock absorber;

wherein the damper control module receives data from the sensor, determines a target damping state of the shock absorber based on the data, determines a present state of the electro-mechanical valve and determines whether the state of the valve must change to achieve the target damping state, and actuates the electro-mechanical valve to control flow of the working fluid between the working chamber and the reservoir chamber at the target damping state, the damper control module including a damper setting module including a circuit board having damper setting logic which determines the target damping state of the shock absorber based on the data received from the sensor, wherein the target damper setting is determined without the damper setting module receiving any other signal than the data from the sensor.

16. The damper system of claim 15, wherein the shock absorber includes a plurality of sensors disposed at the shock absorber.

17. The damper system of claim 15, wherein the damper control module is in communication with a communications network associated with the vehicle.

18. The damper system of claim 17, wherein the damper control module sends signals via the communications network associated with the vehicle to a remote module associated with the vehicle.

19. The damper system of claim 15, wherein the damper control module also receives signals from at least one additional sensor or subsystem which is located remotely from the shock absorber.

20. The damper system of claim 19, wherein the at least one additional sensor or subsystem, comprises at least one of:

a three-axis accelerometer disposed at the shock absorber;

an angular rate sensor;

an inertial measurement unit (IMU);

a temperature sensor;

a height sensor;

an accelerometer;

a tri-axial acceleration sensor;

a potentiometer; or a global positioning system (GPS) or tracking sensor.

* * * * *